United States Patent [19]

Krinski et al.

[11] Patent Number: 4,713,116
[45] Date of Patent: Dec. 15, 1987

[54] PROTEIN MODIFIED WITH A SILANATION REAGENT AS AN ADHESIVE BINDER AND PROCESS OF PRODUCING

[75] Inventors: Thomas L. Krinski, Granite City, Ill.; Alan L. Steinmetz, Keego Harbor, Mich.

[73] Assignee: Ralston Purina Company, St. Louis, Mo.

[21] Appl. No.: 226

[22] Filed: Jan. 2, 1987

[51] Int. Cl.[4] .......................... C08L 89/00; C09J 3/18
[52] U.S. Cl. ................................. 106/154.1; 106/124; 530/370; 530/377; 530/378
[58] Field of Search ............................ 106/124, 154.1; 530/370, 377, 378

[56] References Cited

U.S. PATENT DOCUMENTS 2,932,589  4/1960  Meyer et al. .................... 106/154.1
3,726,972  4/1973  Miller ................................. 530/377
4,352,692  10/1982 Krinski et al. ......................... 106/79
4,421,564  12/1983 Graham et al. .................... 106/154.1
4,474,694  10/1984 Coco et al. ........................... 106/124
4,554,337  11/1985 Krinski et al. ....................... 106/124

Primary Examiner—Paul Lieberman
Assistant Examiner—Ronald A. Krasnow
Attorney, Agent, or Firm—Virgil B. Hill

[57] ABSTRACT

A modified vegetable protein adhesive binder and a process for producing the same is disclosed wherein an alkaline protein dispersion is treated with organosilane reagent in an amount sufficient to modify the protein material. The modified vegetable protein adhesive binder provides greater pigment structuring when employed in paper coating compositions containing pigment and other materials such as latex. The modified binder also results in coatings with an improved degree of wet rub resistance.

50 Claims, No Drawings

PROTEIN MODIFIED WITH A SILANATION REAGENT AS AN ADHESIVE BINDER AND PROCESS OF PRODUCING

BACKGROUND OF THE INVENTION

This invention relates to a modified vegetable protein adhesive material useful as a binder and pigment structuring additive for paper coatings as well as a process for producing the same.

Vegetable protein materials are well known as adhesive binders for pigment containing coatings which are used for the coating of paper. Pigment containing coatings provide the paper with a desirable finish, gloss, and smoothness. The functions of the pigment in the coating are to fill in the irregularities of the paper surface and to produce an even and uniformly absorbent surface for printing. The adhesive binder functions to bind the pigment particles to each other as well as to the surface of the coating, as well as interact with pigment particles to structure the pigmented coating and produce the desired porosity and surface smoothness. The selection of a suitable adhesive or binder is therefore an important factor in the quality of a coating applied to paper.

Vegetable protein materials have been extensively used as adhesive binders for paper coatings, and among those materials have been the vegetable protein isolates, typically soy isolate. Isolated soy protein is produced by the treatment of oil free soy bean flakes with an alkaline solution to dissolve the protein which is removed from the non soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for use in the preparation of pigment containing paper coating compositions. The unhydrolyzed or unmodified soy protein isolates are generally less desirable as adhesive binders for paper coatings because of relatively low solubility in weak alkaline solutions, high solution viscosity and sensitivity to heat, besides a tendency to form gels at temperatures of about 160° F. Because of these disadvantages, unmodified or nonhydrolyzed soy protein is usually modified in some way to lower the viscosity of coating compositions containing these materials as binders and furthermore to increase the adhesive strength of the protein when it is dispersed in weak alkaline solutions. Modification or hydrolysis of the protein also reduces the sensitivity of the protein to heat. Modification of the protein usually consists of hydrolysis or treatment of the extracted protein in an aqueous dispersion with various alkaline reagents under controlled conditions of pH, temperature, and time; native or unmodified. These conditions dissociate the protein structure into smaller sub-units thereby improving the solubility of this material as a binder in paper coatings.

Another means of modifying the protein is to treat the unmodified protein with various chemical reagents in order to alter the rheological properties of coatings containing the modified protein material as a binder. Generally, the purpose of modifying the protein is to provide for increased fluidity of the protein material in alkaline dispersions and also much lower viscosity of coating compositions prepared with the modified protein material as a binder.

U.S. Pat. No. 2,862,918 describes such a modified protein wherein an isolated soy protein which has been hydrolyzed beyond the gel stage is acrylated by treatment of the hydrolyzed soy protein material with a carboxylic acid anhydride, such as acetic anhydride. U.S. Pat. No. 2,932,589 describes a paper coating composition and process in which a modified soy protein material is produced by reaction of an isolate with a dicarboxylic acid anhydride, such as phthalic anhydride.

U.S. Pat. No. 4,474,694 also describes a modified vegetable protein adhesive binder and a process for producing the same in which an alkaline dispersion of a vegetable protein material is reacted initially with a reducing agent, followed by reaction with a carboxylic acid anhydride to modify the protein material and provide a coating with improved strength and ink receptivity.

In spite of the various improvements that have been obtained by chemical modification of vegetable protein material and the use of these materials in the preparation of paper coating compositions, it would still be desirable to obtain a modified protein material that interacts with pigment particles, changes the rheological properties of the coating and improves the pigment structure in the coating. This objective has been generally achieved in the present invention by the production of a modified vegetable protein material which is suitable in paper coating compositions containing pigments.

It is therefore an object of the present invention to provide a modified proteinaceous adhesive binder of good rheological properties.

It is a further object to provide a modified vegetable protein adhesive binder having good pigment binding and paper coating characteristics.

SUMMARY OF THE INVENTION

These and other objects are achieved in the present invention by the production of a modified vegetable protein adhesive binder having good rheological and paper coating characteristics. The present invention provides a process for the production of a modified vegetable protein adhesive binder which is suitable for use in pigment coating compositions wherein the process of producing the modified binder comprises forming an alkaline dispersion of a vegetable protein material followed by reaction of the dispersion with an organosilane reagent in an amount sufficient to modify the protein material.

Preferably, the organosilane reagent is a silanation reagent such as an alkoxy silane reagent, most preferably an alkene alkoxy silane reagent, such as an alkene trialkoxy silane reagent. Modification of the protein material with the acrylate reactant occurs through modification of the various primary amino groups which are present in the amino acid residues of the vegetable protein material.

The vegetable protein material modified with the organosilane reagent provides an adhesive binder in paper coating compositions in which a significant improvement is achieved in preparing a product that interacts with pigments in the coating. The silane modified protein is believed to interact with the pigment surface, to improve its uniformity thereby improving packing of the pigments in the coating. The coating composition with the modified binder also has an improved degree of wet rub resistance. The use of the organosilane reagent for modification of the vegetable protein material pursuant to the present invention provides a unique modified vegetable protein material having improved characteristics in pigment containing paper coating compositions prepared therewith.

DESCRIPTION OF THE PREFERRED EMBODIMENTS

The present invention applies to a modified protein material suitable as an adhesive in paper coating compositions. More specifically the present invention pertains to a vegetable protein material, such as a vegetable protein isolate and most preferably to a soy isolate. A soy isolate is the most commonly produced protein isolate derived from vegetable plant sources. The present invention is therefore described with respect to a soy isolate since this is the primary area of concern for which the present invention was developed, although it is apparent that other vegetable protein materials can be employed and modified in a similar manner if desired. For purposes of explanation in the context of the present invention, an isolated soy protein material is initially prepared by treatment of defatted soy bean flakes with an alkaline solution to solubilize the protein. The protein extract is then separated from the alkali insoluble solids by filtration or centrifugation. This protein extract or dispersion is typically used as the starting material in the process of the present invention. The extract or dispersion of the globular protein from the soy flakes will typically have a pH between 9.5 and 11.2. Using the protein extract from the isolate process is a preferred way of using an isolate in the preparation of the modified soy protein material of the present invention, since the extract itself has the protein already contained in an alkaline aqueous dispersion. However, it is equally apparent that a dried protein isolate which has been previously isolated from the soy flakes and dried may be used as the starting material wherein an alkaline dispersion of the dried protein material is formed for purposes of carrying out the chemical modification of the protein material pursuant to the present invention. Furthermore, the particular type of alkaline material that may be used to disperse the protein material or provide the alkaline extract of the soy bean flakes is not critical to the practice of the present invention, and in fact, any type of alkali or alkaline earth hydroxide or salts thereof, may be readily and conveniently employed in preparation of the protein dispersion.

The alkaline dispersion of vegetable protein material may then be maintained in a substantially unhydrolyzed condition or may be hydrolyzed if desired prior to reaction with the organosilane reagent. Maintenance of the protein in a substantially unhydrolyzed condition refers to the absence of any significant reduction in the individual sub unit molecular weight of the protein material. On the other hand, hydrolysis is achieved by the degree of reduction in these molecular sub units and is typically accomplished by heating at an alkaline pH usually 10 to 12.5, at a temperature of at least 50° C. for a minimum of 30 minutes. The particular degree of hydrolysis is not critical to the present invention and protein materials in either a hydrolyzed or unhydrolyzed condition may be employed in the present invention.

Typically, an alkaline dispersion of the vegetable protein material is in a hydrolyzed or unhydrolyzed condition, formed to provide a dispersion having a proteinaceous solids level of at least about 2% by weight, typically 2 to 20% by weight. A most preferred level of proteinaceous solids in the dispersion is about 10% by weight. Furthermore, it is preferred that the dispersion have a pH of about 8 to 12, and preferably about 9 to 11. A most preferred pH for the alkaline dispersion for purposes of chemical modification of the protein is a pH of about 10.

The dispersion of protein material is then reacted with an organosilane reagent in an amount sufficient to modify the protein material. The preferred reaction conditions for purposes of modifying the protein material include a temperature of about 20° to 60° C., and preferably 40° to 50° C., as well as a maintenance of a pH of about 9 to 10 during modification of the protein. The exact temperature and time of reaction or modification of the protein is not critical to the present invention, and because of the general relationship between time and temperature, relatively longer times of reaction would be required when low temperatures are employed, whereas relatively short reaction times would be required when somewhat higher temperatures are employed. The temperature for reaction or modification of the protein is limited only by the fact that if too high a temperature is employed it may adversely affect the coating characteristics of the protein material, and it is preferred that temperature of reaction not exceed 70° C., and most preferably by maintained below 60° C. A typical amount of organosilane reagent is about 2% to 15% by weight of the protein solids, and preferably about 5% to 10% by weight of the protein solids.

Various organosilane reagents can be employed in the modification of the protein material pursuant to the process of the present invention. Preferred reagents are alkoxy silane compounds, and most preferably alkene alkoxy silane compounds such as alkene trialkoxy silane's. Specific materials that can be employed include gamma-glycidyl-oxypropyl trimethoxy silane, vinyl tris (beta-methoxy ethoxy) silane, gamma-methacryloxy propyl trimethoxy silane, vinyl trimethoxy silane, and vinyl triethoxy silane. Other types of silanation reagents may also be employed if desired.

Following modification of the protein material with the organosilane reagent, the modified protein material can be isolated by acid precipitation at the isoelectric point of the protein which is typically at a pH of about 4 to 5, and otherwise recovered by washing, filtering, pressing, or dewatering and drying of the product. Alternatively, the modified protein material can be spray dried in the form of the alkaline dispersion without isoelectric precipitation if desired to provide a dried modified protein material also suitable for use in the preparation of pigment containing coating compositions.

Although the present invention has not intended to be limited by the exact types of coating compositions in which the modified protein adhesive binder of the present invention may be employed; nevertheless, typical coating compositions which employ the modified protein adhesive binder of the present invention generally include ingredients such as pigments, fluidizers or thinning agents, as well as various other ingredients such as optical brighteners and co-binders such as acrylic or styrene-butadiene latexes. Typically the modified vegetable protein adhesive binder of the present invention is dispersed in a solubilizing agent such as an alkaline material, typically sodium carbonate, ammonium hydroxide, sodium hydroxide and the like. These materials provide a conventional means of solubilizing various types of protein materials for use as adhesive binders in paper coating compositions. The exact amount of protein isolate used to prepare the binder solution is at a level sufficient to form an adhesive binder, for the pigment coating and typically of a sufficient level so when the coating composition with the mineral pigment is prepared about 1 to 20% by weight of the coating comprises binder.

It may be desirable to further employ fluidizers or thinning agents in the preparation of the protein binder solution. This will improve the ultimate viscosity of coating compositions which are prepared with the protein binder solution. Typical fluidizers include materials such as dicyandiamide, ammonium nitrate, or urea. These agents may be employed in the preparation of the binder solution of the present invention and are added in amounts of between about 5 to 20%, preferably 5 to 10% by weight of the protein used to prepare the binder.

Following the formation of the protein binder solution, it is mixed with a mineral pigment in an amount sufficient to provide a slurry typically having a solids content of at least about 36% by weight, and typically between about 38 and 65% by weight of such slurry. The exact amount of pigment which may be employed in the present invention is not critical since a variety of levels may be suitable depending upon the exact coating characteristics desired. It is, therefore, typical to employ the pigment in an amount sufficient to provide a uniform coating on the substrate; the exact amount is not critical to the practice of the present invention. Furthermore, the exact type of pigment which may be employed is not critical and a variety of mineral pigments commonly used in the preparation of paper coatings, such as clay, calcium carbonate, titanium dioxide, and the like, are suitable.

Following dispersion of the mineral pigment with the proteinaceous adhesive binder solution, various other ingredients are added; such materials typically include co-binders such as the various latexes, preferably acrylic or styrene-butadiene latexes, which further improve the coating characteristics of the composition. The exact components of the coating composition with which the modified binder of the present invention may be employed is not critical to its practice since these represent a variety of materials all of which are well known to those skilled in the art.

The following examples represent specific but nonlimiting embodiments of the present invention.

EXAMPLE 1

200 pounds of solvent extracted soybean flakes were extracted with 2,000 pounds of water at 90° F. to which was added 2.5% by weight of the flakes of calcium hydroxide. The soybean flakes were extracted for 30 minutes with the alkaline solution in order to solubilize the protein and the alkaline insoluble solids were then removed by centrifugation. The alkaline insoluble solids or extracted flakes were then re-extracted with an additional 1,000 pounds of water which had been preheated to a temperature of 90° F. in order to solubilize additional protein in the extracted flakes. Following extraction, the insoluble solids or extracted flakes were again removed from the extract by centrifugation.

The alkaline protein extracts at a pH of 10.5 were then combined and 8% by weight of the protein solids of sodium hydroxide was added. The solubilized protein was hydrolyzed by heating at 60° C. for 90 minutes.

The hydrolyzed protein extract was then cooled to 50° C. and the pH adjusted to 11. To the extract having a pH of 11, was added 10% by weight of the portion solids of gamma-glycidyl-oxypropyl trimethoxy silane. The dispersion was maintained at 50° C. and stirred for a period of one hour. Following modification of the soy protein, the pH of the dispersion was adjusted about 4.3, by the addition of sulfuric acid in order to precipitate the protein. The precipitated protein was then concentrated by centrifugation, washed twice with water and air dried.

EXAMPLE 2

The modified protein binder produced in Example 1 was evaluated as an adhesive binder in a pigment containing paper coating composition and compared to a hydrolyzed but nonmodified soy isolate to serve as a control sample, that is generally produced as described in Example 1, but without chemical modification of the protein.

Alkaline dispersions of the modified proteins of Examples 1 and the unmodified control sample were prepared by dispersing the proteins at a solids level of 13.5% by weight in a 0.3 molar ammonium hydroxide solution.

Three separate paper coating compositions were prepared having a total solids level of 47.4% by weight in which the coating contained 100 parts by weight (dry basis) of clay, 0.2 parts (dry basis) of tetra sodium pyrophosphate, 10 parts by weight (dry basis) of a styrene-butadiene latex and 5 parts by weight (dry basis) of either the modified protein isolates of Example 1 or the unmodified protein control sample as the binders.

The rheological properties of the coatings were evaluated as listed in Table 1. The coating compositions containing the different binders were then applied to paper with a draw down bar. The coated paper was evaluated for gloss, IGT value and ink receptivity. The IGT value measures the force the coating will withstand with certain types of ink used in printing. The ink receptivity is measured by the percentage surface brightness drop when K&N ink is applied for a short time and removed. The smaller the number for ink receptivity, the more nonporous the coating is and therefore a lesser degree of ink penetration into the coating. These various methods for evaluating the coating are standard methods of measurement published by the Technical Association of Pulp and Paper Industries (TAPPI). The results of the testing are set forth in Table 2.

TABLE 1

| Coating Viscosity (CPS) of Coating Formulations at 25° C. | | |
|---|---|---|
| | MODIFIED ISOLATE Example 1 | UNMODIFIED ISOLATE CONTROL Example 3 |
| RVT VISCOSITY | | |
| 10 RPM | 5,350 | 1,000 |
| 20 RPM | 3,025 | 670 |
| 50 RPM | 1,350 | 388 |
| 100 RPM | 745 | 286 |
| S.D. Warren Water Retention | | |
| SEC. | 12.9 | 12.3 |

TABLE 2

Evaluation of Coating Formulations

| | MODIFIED ISOLATE Example 1 | UNMODIFIED ISOLATE Control |
|---|---|---|
| Coatweight (g/m$^2$) | 14.5 | 15.4 |
| 75° Gloss (%) | 79.7 | 79.4 |
| Opacity (%) | 94.5 | 94.7 |
| Brightness | 77.6 | 77.6 |
| K & N Ink Receptivity (% drop) | 17.8 | 14.5 |
| IGT Coating Lift Off (cm/sec) | 206 | 192 |
| Ink Speed/Pressure | 5 M/50 | 5 M/50 |
| Wet Rub % T | 90.1 | 83.0 |

The above data indicate that the coatings containing the modified soy protein indicate that the coating containing the modified soy protein interacts with the pigment particles thereby increasing solution viscosity. This interaction promotes greater porosity as demonstrated by the greater K&N ink receptivity number. Increasing porosity will improve surface smoothness and likewise printability. The modified soy protein has much better wet rub resistance than the unmodified control.

EXAMPLE 3

An unhydrolyzed soy protein isolate was prepared by extracting two 600 g samples of defatted soy flakes with water at 90° F., to which was added 2.5% by weight of the flakes of calcium hydroxide. The flakes were extracted for 30 minutes to solubilize the protein. The alkali insoluble solids were removed by centrifugation and re-extracted with an additional quantity of water at 90° F. to extract any remaining soluble protein. The alkali insoluble solids were again removed by centrifugation and the two extracts combined.

The alkali extract was heated to 50° F., at which point 8% by weight of sodium hydrazide was added. This was followed by the addition of 10% by weight of the protein solids of gamma-glycidyl-oxypropyl trimethoxy silane. The dispersion was maintained at 50° C. and stirred for a period of one hour. Following modification of the soy protein, the pH of the dispersion was adjusted to about 4.3 by the addition of sulfuric acid in order to precipitate the protein. The precipitated protein was concentrated by centrifugation, washed twice with water and air dried.

The modified protein binder produced as described above, was evaluated as an adhesive binder in a pigment containing paper coating composition. The modified protein binder was compared to an unhydrolyzed soy isolate generally produced as described above, but was not reacted with the organosilane reagent, and against a soy isolate modified with a carboxylic acid anhydride, as described in U.S. Pat. No. 4,474,694. Coating compositions were prepared with each of the above protein materials, by the dispersing of the different protein binders at a solids level of 13.5% by weight in a 0.3M ammonium hydroxide solution.

Three separate paper coating compositions were prepared having a total solids level of 47.4% by weight in which the coating contained 100 parts by weight (dry basis) of clay, 0.2 parts (dry basis) of tetra sodium pyrophosphate, 10 parts by weight (dry basis) of a styrene butadiene latex and 5 parts by weight (dry basis) of one of the above identified protein binders.

The rheological properties of the coatings were evaluated as listed below in Table 3. The coating compositions containing the different binders were then evaluated as described in Example 2, and the results of the evaluation set out in Table 4 below.

TABLE 3

Coating viscosity (CPS) of coating formulations at 25° C.

| | MODIFIED ISOLATE USA - 4,474,694 CARBOXYLIC ANHYDRIDE | MODIFIED ISOLATE WITH ORGANOSILANE REAGENT-UNHYDROLYZED | UNMODIFIED UNHYDROLYZED ISOLATE |
|---|---|---|---|
| RVT VISCOSITY | | | |
| 10 RPM | 600 | 17,400 | 10,100 |
| 20 RPM | 380 | 9,300 | 5,550 |
| 50 RPM | 240 | 4,160 | 2,500 |
| 100 RPM | 200 | 2,320 | 1,400 |
| S.D. WARREN WATER RETENTION | | | |
| SEC. | 15.6 | 10.2 | 7.3 |

TABLE 4

Evaluation of Coating Formulations

| | MODIFIED ISOLATE USA - 4,474,694 CARBOXYLIC ANHYDRIDE | MODIFIED ISOLATE WITH ORGANOSILANE REAGENT-UNHYDROLYZED | UNMODIFIED UNHYDROLYZED ISOLATE |
|---|---|---|---|
| Coatweight (g/m$^2$) | | | |
| 75° Gloss (%) | 79.3 | 76.5 | 73.8 |
| Opacity (%) | 93.0 | 92.8 | 92.9 |
| Brightness | 77.9 | 78.1 | 77.8 |
| K & N Ink Receptivity | 19.5 | 22.8 | 21.7 |
| IGT Coating Lift off (cm/sec) | 231 | 183 | 224 |
| Ink | 5 | 5 | 5 |
| Wet Rub Resistance % T | 78.1 | 93.7 | 90.0 |

It may be seen from the above evaluation that the wet rub resistance of the protein binder modified with an organosilane reagent was superior to the other two binders, although the pick strength (IGT) was relatively poor.

While the present invention has been described with regard to the specific embodiments set forth above, it should be understood that it is intended to include within the scope of the present invention all equivalents thereto.

What is claimed is:

1. A process for the production of a modified vegetable protein adhesive binder comprising:
   (a) forming an alkaline dispersion of a vegetable protein material;
   (b) treating said dispersion with a organosilane reagent in an amount sufficient to modify the protein material.

2. The process of claim 1 wherein said vegetable protein material is a vegetable protein isolate.

3. The process of claim 1 wherein said dispersion has a proteinaceous solids level of at least about 2% by weight.

4. The process of claim 3 wherein said dispersion has a proteinaceous solids level of 2 to 20% by weight.

5. The process of claim 4 wherein said dispersion has a proteins solids level of about 3 to 12% by weight.

6. The process of claim 1 wherein said dispersion has a pH of about 8 to 12.

7. The process of claim 6 wherein said dispersion has a pH of about 9 to 11.

8. The process of claim 7 wherein said dispersion has a pH of about 10.

9. The process of claim 1 wherein said dispersion has a temperature of about 20° to 60° C.

10. The process of claim 1 wherein the amount of organo silane reagent is about 2 to 15% by weight of the protein solids.

11. The process of claim 10 wherein the amount of organo silane reagent is about 5% to 10% by weight of the protein solids.

12. The process of claim 1 wherein the organo silane reagent is an alkoxy silane reagent.

13. The process of claim 12 wherein the alkoxy silane reagent is an alkene alkoxy silane.

14. The process of claim 13 wherein the alkene alkoxy silane is an alkene trialkoxy silane.

15. The process of claim 13 wherein the alkene alkoxy silane is selected from the group consisting of gamma-glycidyl-oxypropyl trimethoxy silane, vinyl tris (beta-methoxy ethoxy) silane, gamma-methacryloxy propyl trimethoxy silane, vinyl trimethoxy silane, and vinyl triethoxy silane.

16. The process of claim 1 wherein the vegetable protein material is a soy protein isolate.

17. The process of claim 1 including the step of adjusting the pH of the treated dispersion to the isoelectric point to precipitate the modified protein material.

18. The process of claim 1 including the step of dewatering the modified protein material.

19. A process for the production of modified vegetable protein adhesive binder comprising:
   (a) forming an alkaline dispersion of a vegetable protein material having a proteinaceous solids level of at least 2% by weight, and
   (b) treating said dispersion with a alkoxy silane reagent in an amount sufficient to modify the protein material.

20. The process of claim 19 wherein said vegetable protein material is a vegetable protein isolate.

21. The process of claim 19 wherein said dispersion has a solids level of about 2 to 20% by weight.

22. The process of claim 19 wherein said dispersion has a proteinaceous solids level of 3 to 12% by weight.

23. The process of claim 19 wherein said dispersion has a pH of about 8 to 12.

24. The process of claim 23 wherein said dispersion has a pH of about 9 to 11.

25. The process of claim 23 wherein said dispersion has a pH of about 10.

26. The process of claim 19 wherein said dispersion has a temperature of about 20° to 60° C.

27. The process of claim 19 wherein the amount of alkoxy silane reagent is about 2 to 15 by weight of the proteinaceous solids.

28. The process of claim 24 wherein the amount of alkoxy silane reagent is about 5 to 10 by weight of the proteinaceous solids.

29. The process of claim 19 wherein the alkoxy silane reagent is an alkene alkoxy silane.

30. The process of claim 29 wherein the alkene alkoxy silane is an alkene trialkoxy silane.

31. The process of claim 29 wherein the alkene alkoxy silane is selected from the group consisting of gamma-glycidyl oxypropyl trimethoxy silane, vinyl tris (beta-methoxy ethoxy) silane, gamma-methacryloxy propyl trimethoxy silane, vinyl trimethoxy silane and vinyl triethoxy silane.

32. The process of claim 19 wherein the vegetable protein material is a soy protein isolate.

33. The process of claim 19 including the step of adjusting the pH of the treated dispersion to the isoelectric point to precipitate the modified protein material.

34. The process of claim 19 including the step of dewatering the modified protein material.

35. A process for the production of modified vegetable protein adhesive binder comprising
   (a) forming an alkaline dispersion of a vegetable protein material having a proteinaceous solids level of about 2 to 20% by weight,
   (b) treating said dispersion with an alkene alkoxy silane in an amount sufficient to modify the protein material.

36. The process of claim 35 wherein said vegetable protein material is a vegetable protein isolate.

37. The process of claim 35 wherein said dispersion has a proteinaceous solids level of 3 to 12% by weight.

38. The process of claim 35 wherein said dispersion has a pH of about 8 to 12.

39. The process of claim 38 wherein said dispersion has a pH of about 9 to 11.

40. The process of claim 35 wherein said dispersion has a temperature of about 20° to 60° C.

41. The process of claim 35 wherein the amount of alkene alkoxy silane is about 2% to 15% by weight of the proteinaceous solids.

42. The process of claim 41 wherein the amount of alkene alkoxy silane is about 5% to 10% by weight of the proteinaceous solids.

43. The process of claim 35 wherein the alkene alkoxy silane is an alkene trialkoxy silane.

44. The process of claim 35 wherein the alkene alkoxy silane is selected from the group consisting of gamma-glycidyl oxypropyl trimethoxy silane, vinyl tris (beta-methoxy ethoxy) silane, gamma-methacryloxy propyl trimethoxy silane, vinyl trimethoxy silane, and vinyl triethoxy silane.

45. The process of claim 35 wherein the vegetable protein material is a soy protein isolate.

46. The process of claim 35 including the step of adjusting the pH of the treated dispersion to the isoelectric point to precipitate the modified protein material.

47. The process of claim 35 including the step of dewatering the modified protein material.

48. The product produced by the process of claim 1.

49. The product produced by the process of claim 19.

50. The product produced by the process of claim 35.

* * * * *